United States Patent
Baker et al.

(10) Patent No.: US 9,756,510 B2
(45) Date of Patent: Sep. 5, 2017

(54) METHODS AND DEVICES FOR PROVIDING MEASUREMENT REPORTS

(75) Inventors: Matthew Baker, Canterbury (GB);
Teck Hu, Melbourne, FL (US);
Christian Gerlach, Ditzingen (DE); Qi Jiang, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 600 days.

(21) Appl. No.: 13/884,324

(22) PCT Filed: Nov. 9, 2010

(86) PCT No.: PCT/CN2010/078552
§ 371 (c)(1),
(2), (4) Date: May 9, 2013

(87) PCT Pub. No.: WO2012/061976
PCT Pub. Date: May 18, 2012

(65) Prior Publication Data
US 2013/0229940 A1    Sep. 5, 2013

(51) Int. Cl.
*H04B 7/185* (2006.01)
*H04W 24/02* (2009.01)
(Continued)

(52) U.S. Cl.
CPC ........... *H04W 24/02* (2013.01); *H04W 24/10* (2013.01); *H04W 28/048* (2013.01); *H04W 48/16* (2013.01)

(58) Field of Classification Search
CPC . H04W 72/04; H04W 72/082; H04W 72/005; H04W 84/045; H04W 24/00; H04W 24/10; H04W 28/048; H04W 36/30
(Continued)

(56) References Cited

U.S. PATENT DOCUMENTS 8,520,617 B2 *   8/2013   Krishnamurthy et al. ... 370/329
2010/0110964 A1   5/2010   Love et al.
(Continued)

FOREIGN PATENT DOCUMENTS

CN    101867980 A    10/2010
CN    101873612 A    10/2010
(Continued)

OTHER PUBLICATIONS

International Search Report for PCT/CN2010/078552 dated Aug. 4, 2011.
(Continued)

*Primary Examiner* — Hanh N Nguyen
(74) *Attorney, Agent, or Firm* — Fay Sharpe, LLP

(57) ABSTRACT

The invention proposes method of providing measurement reports. The eNodeB sends (S10, S11) a user equipment information about a plurality of subframe patterns used by a plurality of wireless networks respectively, and notifies (S12, S13) the user equipment associations between the measurement reports and said plurality of subframe patterns. The user equipment measures (S14) channel information in at least one subframe patterns, generates measurement reports for said at least one subframe patterns according to said association, and sends (S15, S16) said measurement reports to said eNodeB. The eNodeB relates (S17) each of the received measurement reports with the corresponding subframe pattern according to said association.

19 Claims, 2 Drawing Sheets

(51) Int. Cl.
*H04W 24/10* (2009.01)
*H04W 28/04* (2009.01)
*H04W 48/16* (2009.01)

(58) Field of Classification Search
USPC ....... 370/328, 329, 330, 331, 332, 341, 338,
370/343, 345, 448, 447, 461; 455/436,
455/443, 444, 450, 452.1, 456.2, 524,
455/115.3, 132–135; 375/346, 348, 350,
375/351
See application file for complete search history.

(56) References Cited

U.S. PATENT DOCUMENTS

| | | | |
|---|---|---|---|
| 2010/0135235 A1* | 6/2010 | Ji et al. | 370/329 |
| 2010/0273473 A1 | 10/2010 | Meshkati et al. | |
| 2010/0278132 A1 | 11/2010 | Palanki | |
| 2012/0134275 A1* | 5/2012 | Choi et al. | 370/241 |

FOREIGN PATENT DOCUMENTS

| | | |
|---|---|---|
| WO | WO0076242 A1 | 12/2000 |
| WO | WO2007/066883 A1 | 6/2007 |

OTHER PUBLICATIONS

Nokia Siemens Networks, "On TDM eICIC Coordination for Macro+Pico Cases", 3GPP TSG RAN WG3 #69-BIS Meeting, R3-102817, Xi'an, China, Oct. 11-15, 2010.

Nokia Siemens Networks, "On X2 signaling for TDM eICIC in Macro+Pico scenarios", 3GPP TSG RAN WG3 #70-BIS Meeting, R3-103555, Jacksonville, United States, Nov. 15-19, 2010.

Nokia Siemens Networks, Nokia Corporation, "RRC Impact of eICIC", 3GPP TSG RAN WG2 Meeting #71bis, U-105467, Xi'an, China Oct. 11-15, 2010.

* cited by examiner

METHODS AND DEVICES FOR PROVIDING MEASUREMENT REPORTS

TECHNICAL FIELD

The present invention relates to wireless network, and particularly to inter-cell interference coordination.

BACKGROUND

Techniques for enhanced inter-cell interference coordination (ICIC) for co-channel Heterogeneous Network deployment are being introduced in Release 10 of LTE in 3GPP. Co-channel Heterogeneous Networks comprise macrocells and small cells operating on the same frequency channel. Such deployments present some specific interference scenarios for which new ICIC techniques are required.

In one scenario, the small cells are picocells, which are open to users of the macrocellular network. In order to ensure that such picocells carry a useful share of the total traffic load, user equipment (UEs) may be programmed to associate preferentially with the picocells rather than the macrocells, for example by biasing the SINR threshold at which they will select a picocell to associate with. Under such conditions, UEs near the edge of a picocell's coverage area will suffer strong interference from one or more macrocells. In order to alleviate such interference, some subframes may be configured as "blank" or "almost blank" in a macrocell. A blank subframe contains no transmission from the macrocell, while an "almost blank" subframe typically contains no data transmission and little or no control signaling transmission, but will contain reference signal transmissions in order to ensure backward compatibility with legacy terminals which expect to find the reference signals for measurements but are unaware of the configuration of almost blank subframes. Almost blank subframes may also contain synchronisation signals, broadcast control information and/or paging signals.

In order to make the use of blank or almost blank subframes (ABSs) effective (note that hereafter the term "ABS" is used, and should be understood to include both blank and almost blank subframes), signaling is needed from the macrocell to the picocell across the corresponding backhaul interface, known in LTE as the "X2" interface. For LTE Release 10, it has been agreed that this X2 signaling will take the form of a coordination bitmap to indicate the ABS pattern (for example with each bit corresponding to one subframe in a series of subframes, with the value of the bit indicating whether the subframe is an ABS or not). Such signaling can help the picocell to schedule data transmissions in the picocell appropriately to avoid interference (e.g. by scheduling transmissions to UEs near the edge of the picocell during ABSs), and to signal to the UEs the subframes which should have low macrocellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link). It should be noted that subframe patterns that are signalled to the UE for different measurements related to RRM, RLM and CSI could be different in terms of pattern and/or periodicity.

In some cases, a picocell may overlap multiple macrocells, and Pico UEs (PUEs) in different parts of the picocell may therefore suffer interference from different macrocells. Each macrocell may use a different ABS pattern. In such a case, CQI measurements made by a PUE will depend on the particular subframes in which the interference is measured. If the CQI measurements are to be useful to the PeNB in determining which subframes to schedule a PUE in and what modulation and coding scheme (MCS) to use in those subframes, the PeNB needs CQI information corresponding to the different ABS patterns of the different macrocells.

Note that a similar scenario can arise with Heterogeneous Network in which the small cells are femtocells, which operate on a Closed Subscriber Group (CSG) basis, and are therefore typically not open to users of the macrocellular network. In this case, the femtocells can cause strong interference to the macrocell UEs when they come close to the femto eNBs. It may then be beneficial for the macrocells to indicate to their UEs the subframes in which they should make resource specific measurements (i.e. the subframes in which interference from one or more femtocells is reduced or absent).

Current versions of the LTE specifications define only a single CQI report, and this is not related in anyway to particular subframes with different levels of interference.

SUMMARY OF THE INVENTION

To this end, a method for providing measurement report in relation with the corresponding subframe pattern is needed.

In a first aspect of the invention, it is provided a method, in a user equipment, of providing measurement reports, wherein said user equipment is interfered by a plurality of wireless networks, said method comprises the steps of:
  receiving, from a eNodeB, information about a plurality of subframe patterns respectively used by said plurality of wireless networks;
  obtaining, from the eNodeB, associations between the measurement reports and said plurality of subframe patterns;
  measuring channel information in at least one subframe patterns, and generating measurement reports for said at least one subframe patterns according to said associations;
  sending said measurement reports to said eNodeB.

In a second aspect of the invention, it is provided a method, in an eNodeB, of assisting a user equipment to provide measurement reports, wherein said user equipment is interfered by a plurality of wireless networks, said method comprises the steps of:
  sending said user equipment information about a plurality of subframe patterns used by said plurality of wireless networks respectively;
  notifying said user equipment associations between the measurement reports and said plurality of subframe patterns;
  receiving measurement reports from said user equipment, said measurement reports are based on channel information measured by said user equipment in at least one of said plurality of subframe patterns;
  relating each of the received measurement reports with the corresponding subframe pattern according to said associations.

Accordingly, in a third aspect of the invention, it is provided a device, in a user equipment, of providing measurement reports, wherein said user equipment is interfered by a plurality of wireless networks, said device comprises:

a fifth unit for receiving, from a eNodeB, information about a plurality of subframe patterns respectively used by said plurality of wireless networks;

a sixth unit for obtaining, from the eNodeB, associations between the measurement reports and said plurality of subframe patterns;

a seventh unit for measuring channel information in at least one subframe patterns, and generating measurement reports for said at least one subframe patterns according to said association;

an eighth unit for sending said measurement reports to said eNodeB.

In a fourth aspect of the invention, it is provided a device, in an eNodeB, of assisting a user equipment to provide measurement reports, wherein said user equipment is interfered by a plurality of wireless networks, said device comprises:

a first unit for sending said user equipment information about a plurality of subframe patterns used by said plurality of wireless networks respectively;

a second unit for notifying said user equipment associations between the measurement reports and said plurality of subframe patterns;

a third unit for receiving measurement reports from said user equipment, said measurement reports are based on channel information measured by said user equipment in at least one of said plurality of subframe patterns;

a fourth unit for relating each of the received measurement reports with the corresponding subframe pattern according to said association.

These and other features of the present invention will be described in details in the embodiment part.

BRIEF DESCRIPTION OF THE DRAWINGS

Features, aspects and advantages of the present invention will become obvious by reading the following description of non-limiting embodiments with the aid of appended drawings. Wherein, same or similar reference numerals refer to the same or similar steps or means.

DETAILED DESCRIPTION OF EMBODIMENTS

Figure 1:
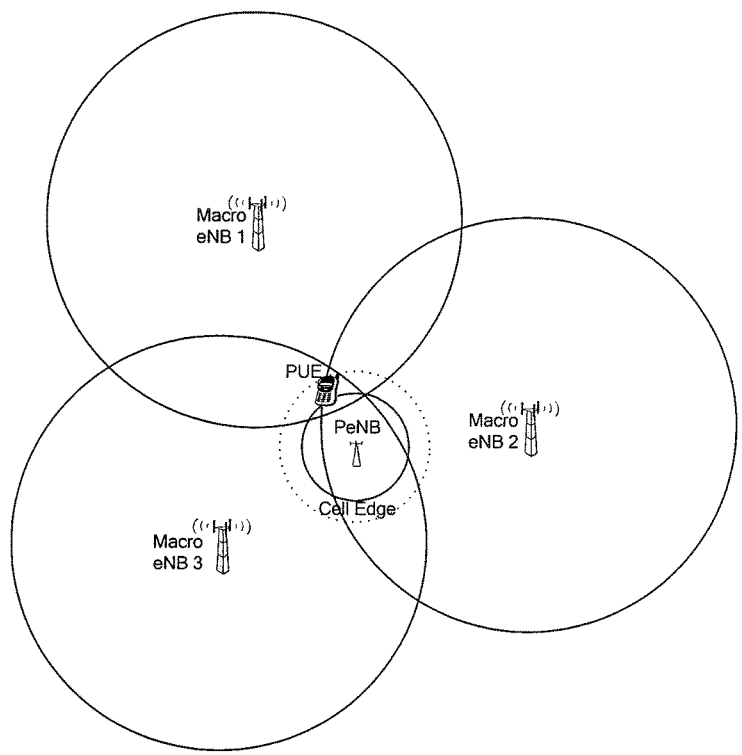
FIG. 1 shows a schematic view of the wireless networks.

FIG. 1 shows an example topology of a heterogeneous network. Wherein the Pico cell dominated by the Pico eNB (PeNB) is near three Macro cells dominated by three Macro eNB. A Pico UE (PUE) locates at the edge of the Pico cell. It should be noted that the invention is not limited to this topology and these two kinds of wireless networks. For example, a macro cell dominated by a macro eNB can be near several femto cells dominated by femto eNB.

Usually, each macrocell uses a different pattern of ABSs and signals its ABS pattern to the PeNB via the X2 interface. Alternatively, the PeNB may be preprogrammed with the ABS patterns of the neighbouring macrocells by means of the Operations and Maintenance (O&M) interface.

The PeNB comprises the device of assisting a user equipment to provide measurement reports. The device comprises the first unit, the second unit, the third unit and the fourth unit. And the PUE comprises a device of providing measurement reports. The device comprises the fifth unit, the sixth unit, the seventh unit and the eighth unit.

Figure 3:
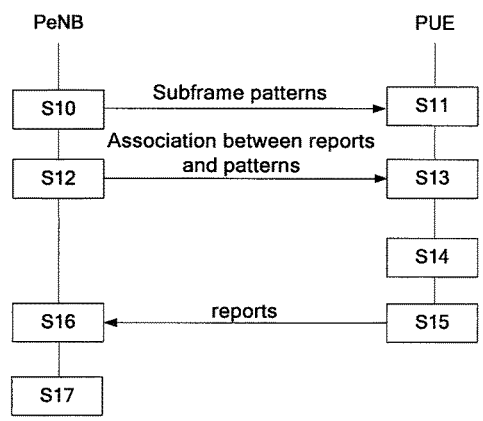
FIG. 3 shows a flowchart of the method of proving measurement reports.

As shown in FIG. 3, in step S10, the first unit sends user equipment PUE information about the three subframe patterns used by the three macro cells respectively. Specifically, if the ABS patterns of the three macrocells are completely non-overlapping, the PeNB may for example signal the three patterns directly to the PUEs. Alternatively, if there is some overlap between the patterns, the PeNB may for example choose to signal subsets of the ABSs such that each measurement subframe pattern signalled to the PUEs comprises only ABSs of one macrocell. Alternatively, a signalled subset could be the common patterns in the event that the patterns of the three macrocells are overlapping. The mechanism used by the PeNB to notify the PUE the subframe patterns of the neighboring cells are not limited by the above examples.

Figure 2:
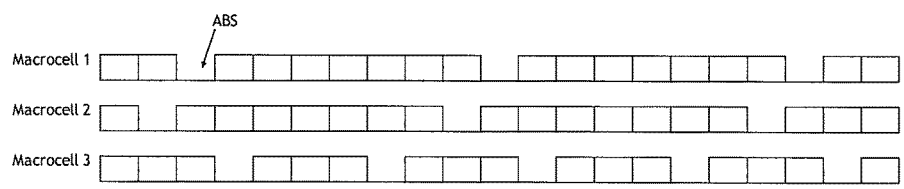
FIG. 2 shows a schematic view of the ABS patterns of 3 macrocells.

As shown in FIG. 2, the pattern of subframes comprises positions of blank frames and/or almost blank frames (ABS) in the patterns.

In a preferred embodiment, the first unit sends the information about the three subframe patterns via RRC signaling.

Correspondingly, as shown in FIG. 3, in step S11, the fifth unit receives the information about the three subframe patterns respectively used by the three macro cells.

In step S12, the second unit notifies user equipment PUE associations between the measurement reports and the three subframe patterns. The number of measurement reports that can be configured to be reported back from the UE would depend on the total number of measurement patterns signaled to the UE. In the following part, CQI measurement report is taken as an example of the measurement report.

In a first embodiment, the CQI measurement report is one of a periodic sequence of CQI measurement reports, and at the time when the periodic sequence is configured, higher layer signaling is used to associate the reports of the sequence with one of the measurement subframe patterns; multiple such sequences of CQI measurement reports may thus be configured, each associated with a different measurement subframe pattern.

In a second embodiment, the association between the CQI measurement report and the measurement subframe pattern is derived from the index of the subframe in which the CQI measurement report is to be sent. For example, the identity of the associated subframe pattern is given by $n_{ss}$ mod N, where $n_{ss}$ is the index of the subframe in which the CQI measurement report is to be sent and N is the index of signaled subframe pattern.

In a third embodiment, the association between the CQI measurement report and the measurement subframe pattern is derived from the index of the subframe in which the CQI measurement report is requested. For example, the identity of the associated subframe pattern is given by $n_{sr}$ mod N, where $n_{sr}$ is the index of the subframe in which the CQI measurement report is requested and N is the index of signaled subframe pattern.

In a fourth embodiment, the association between the CQI measurement report and the measurement subframe pattern is signalled to the PUE by the PeNB together with the signaling that requests the CQI measurement report. For example, LTE Release 8 defines aperiodic CQI reporting, where an individual CQI report is triggered by a single bit transmitted in the uplink grant messages on the Physical Downlink Control Channel (PDCCH). According to the invention, one or more additional bits could be added to such PDCCH messages, to indicate which measurement subframe pattern should be used for the triggered CQI report.

In a fifth embodiment, the association between the CQI measurement report and the measurement subframe pattern cycles through the set of signalled measurement subframe patterns with each successive CQI measurement report. For example, the first CQI measurement report is associated with the first signalled measurement subframe pattern, the second CQI measurement report is associated with the second signalled measurement subframe pattern, and so on.

Correspondingly, in step S13, the sixth unit obtains the associations between the measurement reports and the three subframe patterns.

After that, in step S14, the seventh unit measures channel information in the three subframe patterns. Specifically, the SINR in the patterns are measured.

And in step S14, the seventh unit generates measurement reports for the three subframe patterns according to the obtained association.

In step S15, the eighth unit sends the measurement reports to PeNB. For example, in case that the index of the subframe in which the measurement report is send is relating to the index of the subframe patterns, the eighth unit send each of the measurement report in the corresponding subframe, such that the PeNB could know the subframe pattern to which the received reports corresponds.

In step S16, the third unit receives measurement reports from the user equipment PUE.

In step S17, the fourth unit relates each of the received measurement reports with the corresponding subframe pattern according to the notified association. For example, in case that the index of the subframe in which the measurement report is send is relating to the index of the subframe pattern, the fourth unit acquires the index of the subframe in which the measurement report is send, and determines the index of the subframe pattern.

In an example, the PeNB thus receives three CQI reports from the PUE, with each CQI report being based on interference measured in a different measurement subframe pattern, the PeNB can ascertain the supportable MCS for transmissions to the PUE in subframes where each of the three macrocells is independently using ABSs. This can help the PeNB to know which macrocells are causing significant interference to the UE, and therefore to schedule data transmissions to the PUEs appropriately, for example selecting only subframes where the PUE does not experience significant macrocellular interference, or by adjusting the MCS to reduce the code rate or modulation order in subframes where high interference is experienced.

As to the above step S10 and S11, in some embodiments, the information for subframe patterns to the UEs may be sent via UE-specific dedicated signaling. While in other embodiments it may be sent by broadcast/multicast signaling. For the latter case, due to that the PUE locates in the center suffers little interference thus don't need to provide the measurement report for interference, in a preferred embodiment of the invention, the PeNB sends instruction to the user equipment not to provide measurement reports. And for the PUE locate in the cell edge, the PeNB sends instruction to the user equipment to provide measurement reports.

In an additional embodiment, the PeNB notifies the user equipment to send the measurement report for one specific pattern.

In another additional embodiment, the PeNB notifies the user equipment to activate or deactivate the measurement report for one specific pattern.

In some embodiments, the serving cell may use the CQI reports associated with a given measurement subframe pattern to switch off the signaling of particular measurement subframe patterns to the UEs, for example if all the associated CQI reports indicate that there is no heavy interference in the subframes of a particular pattern.

Those ordinary skilled in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

What is claimed is:

1. A method, in a user equipment, of providing measurement reports, wherein said user equipment is interfered by a plurality of wireless networks, said method comprising:
   receiving, from a eNodeB, information about a plurality of subframe patterns respectively used by said plurality of wireless networks;
   obtaining, from the eNodeB, associations between the measurement reports and said plurality of subframe patterns;
   measuring channel information in at least one subframe patterns, and generating measurement reports for said at least one subframe patterns according to said association;
   sending said measurement reports to said eNodeB.

2. A method according to claim 1, wherein said subframe pattern comprises positions of at least one of blank frames and almost blank frames in said pattern, and said measuring step measures said channel information according to signals from the eNodeB and interferences from said plurality of wireless networks in said blank frames and/or almost blank frames in said pattern.

3. A method according to claim 1, wherein said receiving step receives the information about said plurality of subframe patterns via RRC signaling, one measurement report is associated with one pattern, and wherein said association comprises one of the following:
   the measurement report is associated with the pattern relating to the index of the subframe in which the user equipment sends the measurement report;
   the measurement report is associated the pattern relating to the index of the subframe in which the user equipment received the request for measurement report from the eNodeB.

4. A method according to claim 3, wherein said obtaining step further comprises at least one of:
   receiving, from the eNodeB, instruction to send the measurement report for one specific pattern;
   receiving, from the eNodeB, instruction to activate or deactivate the measurement report for one specific pattern.

5. A method according to claim 1, wherein said receiving step receives said plurality of subframe patterns through either user equipment specific signaling or multicast/broadcast signaling; and/or wherein the method further comprises the step before said measuring step and said sending step:
   receiving, from the eNodeB, instruction to provide or not to provide said measurement reports.

6. A method according to claim 1, wherein said user equipment is Pico user equipment, said eNodeB is a Pico eNodeB and said plurality of wireless networks are macro cells; or wherein said user equipment is macro user equipment, said eNodeB is a macro eNodeB and said plurality of wireless networks are femto cells.

7. A method, in an eNodeB, of assisting a user equipment to provide measurement reports, wherein said user equipment is interfered by a plurality of wireless networks, said method comprising:
sending said user equipment information about a plurality of subframe patterns used by said plurality of wireless networks respectively;
notifying said user equipment associations between the measurement reports and said plurality of subframe patterns;
receiving measurement reports from said user equipment, said measurement reports are based on channel information measured by said user equipment in at least one of said plurality of subframe patterns;
relating each of the received measurement reports with the corresponding subframe pattern according to said association.

8. A method according to claim 7, wherein said subframe pattern comprises positions of at least one of blank frames and almost blank frames in said pattern, and said channel information is measured according to signals from the eNodeB and interferences from said plurality of wireless networks measured by said user equipment in said blank frames and/or almost blank frames.

9. A method according to claim 7, wherein said sending step sends the information about a plurality of subframe patterns via RRC signaling, and one measurement report is associated with one pattern, said association comprises one of the following:
the measurement report is associated with the pattern relating to the number of subframe in which the eNodeB is to receive the measurement report from the user equipment;
the measurement report is associated the pattern relating to the number of subframe in which the eNodeB sends the request for the measurement report to the user equipment.

10. A method according to claim 7, said notifying step comprising either:
notifying the user equipment to send the measurement report for one specific pattern; or
notifying the user equipment to activate or deactivate the measurement report for one specific pattern.

11. A method according to claim 7, wherein said sending step sends said plurality of subframe patterns through user equipment specific signaling or multicast/broadcast signaling; and wherein the method further comprises the step of:
sending instruction to the user equipment to provide or not to provide measurement reports.

12. A method according to claim 8, further comprising:
scheduling data transmissions to the user equipment on at least one of said blank frames and said almost blank frames, according to the measurement reports together with the corresponding subframe pattern.

13. A method according to claim 7, wherein said eNodeB is a Pico eNodeB, said user equipment is Pico user equipment, and said plurality of wireless networks are macro cells; or wherein said eNodeB is a macro eNodeB, said user equipment is macro user equipment, and said plurality of wireless networks are femto cells.

14. A device, in a user equipment, of providing measurement reports, wherein said user equipment is interfered by a plurality of wireless networks, said device comprises:
a fifth unit for receiving, from a eNodeB, information about a plurality of subframe patterns respectively used by said plurality of wireless networks;
a sixth unit for obtaining, from the eNodeB, associations between the measurement reports and said plurality of subframe patterns;
a seventh unit for measuring channel information in at least one subframe patterns, and generating measurement reports for said at least one subframe patterns according to said association;
an eighth unit for sending said measurement reports to said eNodeB.

15. A device, in an eNodeB, of assisting a user equipment to provide measurement reports, wherein said user equipment is interfered by a plurality of wireless networks, said device comprises:
a first unit for sending said user equipment information about a plurality of subframe patterns used by said plurality of wireless networks respectively;
a second unit for notifying said user equipment associations between the measurement reports and said plurality of subframe patterns;
a third unit for receiving measurement reports from said user equipment, said measurement reports are based on channel information measured by said user equipment in at least one of said plurality of subframe patterns;
a fourth unit for relating each of the received measurement reports with the corresponding subframe pattern according to said association.

16. A method according to claim 1, wherein said receiving step receives the information about said plurality of subframe patterns via RRC signaling, and one measurement report is associated with one pattern.

17. A method according to claim 1, wherein said association comprises one of the following:
the measurement report is associated with the pattern relating to the index of the subframe in which the user equipment sends the measurement report;
the measurement report is associated the pattern relating to the index of the subframe in which the user equipment received the request for measurement report from the eNodeB.

18. A method according to claim 7, wherein said sending step sends said plurality of subframe patterns through user equipment specific signaling or multicast/broadcast signaling.

19. A method according to claim 7, wherein the method further comprises the step of:
sending instruction to the user equipment to provide or not to provide measurement reports.

* * * * *